United States Patent [19]

Miyazaki

[11] Patent Number: 6,087,631

[45] Date of Patent: Jul. 11, 2000

[54] SOLDERING IRON WITH TEMPERATURE CONTROL CYCLES RELATED TO RECTIFIED VOLTAGE CYCLES

[75] Inventor: Mitsuhiko Miyazaki, Osaka, Japan

[73] Assignee: Hakko Corporation, Osaka, Japan

[21] Appl. No.: 09/257,639

[22] Filed: Feb. 25, 1999

Related U.S. Application Data

[63] Continuation-in-part of application No. 09/041,524, Mar. 12, 1998.

[30] Foreign Application Priority Data

Mar. 14, 1997 [JP] Japan ................................... 9-082238

[51] Int. Cl.⁷ .............................. B23K 3/02; G01K 7/02; H05B 1/00
[52] U.S. Cl. .......................... 219/241; 219/229; 219/492; 219/473; 374/182
[58] Field of Search ................................ 219/240, 241, 219/497, 492, 494, 501, 229, 236, 237, 233, 209, 473, 544; 374/179, 181, 182; 338/270, 302

[56] References Cited

U.S. PATENT DOCUMENTS

| | | |
|---|---|---|
| 2,717,952 | 9/1955 | Dvorak ..................................... 219/241 |
| 2,747,074 | 5/1956 | Finch ....................................... 219/241 |
| 2,897,335 | 7/1959 | Finch ....................................... 219/241 |
| 3,878,358 | 4/1975 | Barton et al. ............................ 219/216 |
| 4,029,937 | 6/1977 | Russell ..................................... 392/318 |
| 4,086,466 | 4/1978 | Scharlack ................................ 219/494 |
| 4,527,560 | 7/1985 | Masreliez . |
| 4,897,527 | 1/1990 | Cripps et al. ............................ 219/492 |
| 4,960,975 | 10/1990 | Weinbrecht ............................. 219/241 |
| 5,043,560 | 8/1991 | Masreliez . |
| 5,122,637 | 6/1992 | Bottorff et al. ......................... 219/241 |
| 5,397,874 | 3/1995 | Griffith ..................................... 219/497 |
| 5,406,053 | 4/1995 | Masreliez ................................ 219/241 |

FOREIGN PATENT DOCUMENTS 2138297  4/1983  United Kingdom .

*Primary Examiner*—John A. Jeffery
*Attorney, Agent, or Firm*—Vedder Price Kaufman & Kammholz

[57] ABSTRACT

A method of controlling the tip temperature of a soldering iron of the kind to which rectified commercial AC power is supplied. The tip temperature is controlled by setting a control cycle at N times the cycle of AC power and adjusting the number of supply pulses of rectified voltage during each control cycle.

4 Claims, 17 Drawing Sheets

(a)

(b)

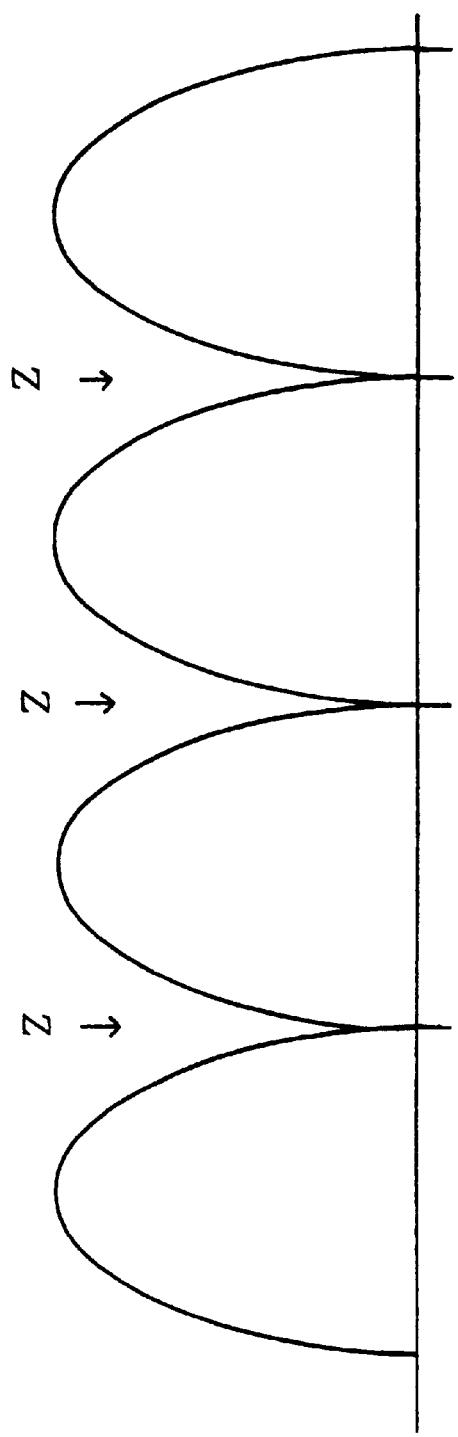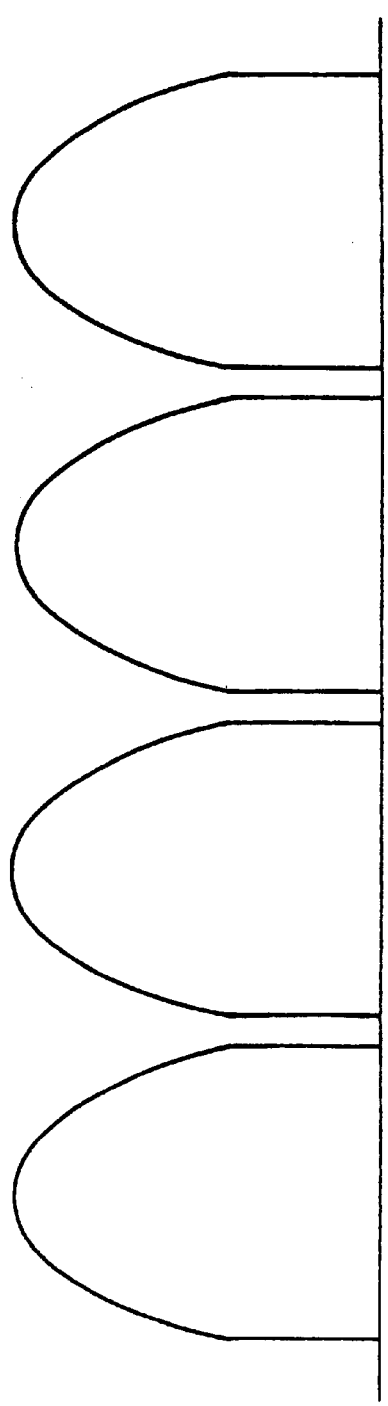
Fig 18
Fig 19

SOLDERING IRON WITH TEMPERATURE CONTROL CYCLES RELATED TO RECTIFIED VOLTAGE CYCLES

CROSS-REFERENCE TO RELATED APPLICATION

This is a continuation-in-part application of U.S. patent application Ser. No. 09/041,524 filed Mar. 12, 1998.

BACKGROUND OF THE INVENTION

1. Field of the Invention

This invention relates to a soldering iron which uses a two-lead type heater-sensor complex comprising a heater unit and a sensor unit as integrated. More particularly, the invention relates to a soldering iron superb in tip temperature control function and free from high-frequency noise.

2. Description of the Related Art

As an example of methods of controlling soldering iron tip temperatures, U.S. Pat. No. 5,043,560 is known. Using the "pulse width control method," this invention varies the power supply time for a soldering iron within a range of 0–100% in half cycle of AC voltage.

Effecting temperature control in every half cycle(H≈8.3 mS), this invention is superior in follow-up, but has the following disadvantage:

Wave forms as shown in FIG. 11 are produced in accordance with tip temperatures, and so voltage supplied to the heater is suddenly brought into "ON" state from "OFF" state. This causes high-frequency noise. The nearer to H/2 is the power supply time(H-T), the larger is the high-frequency noise. So even if DC voltage is supplied to the heater, this defect cannot be remedied as long as the pulse width method is used.

Designed to overcome the above disadvantage, the present invention proposes a novel method for controlling the temperature of a soldering iron tip to replace the foregoing pulse width control method. The present invention also proposes a soldering iron having the desired tip temperature control function and the least high-frequency noise.

SUMMARY OF THE INVENTION

To attain the foregoing objects, the present invention proposes to set a temperature control cycle at N times the cycle of rectified commercial AC power and adjust the supply times of rectified voltage during each control cycle, in controlling the tip temperature of a soldering iron of the kind to which rectified AC power is fed.

BRIEF DESCRIPTION OF THE SEVERAL VIEWS OF THE DRAWING

FIG. 18 is a timing chart describing the circuit operations in Embodiment 3.

FIG. 19 is a timing chart describing the circuit operations in Embodiment 4.

DETAILED DESCRIPTION OF THE PREFERRED EMBODIMENTS

The present invention is now described in further detail with reference to the preferred embodiments shown in the several views of the accompanying drawing.

Figure 1:
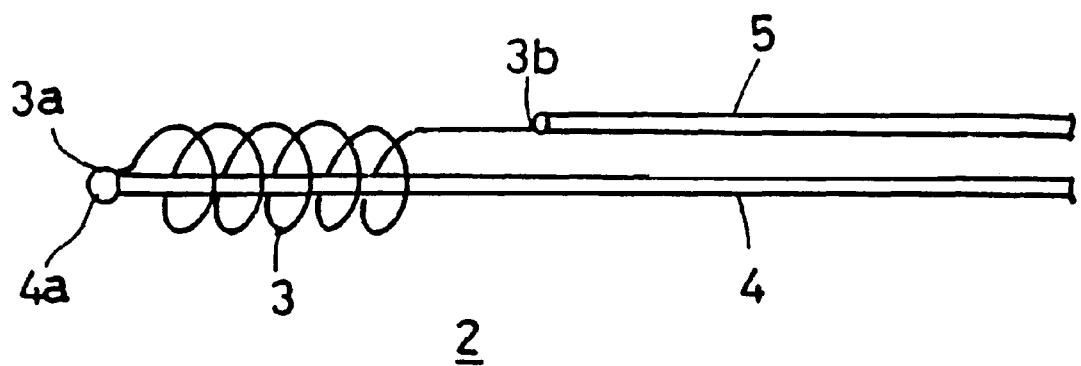
FIG. 1 is a schematic view showing the fundamental construction of a heater-sensor complex used in the present invention.
Figure 2:
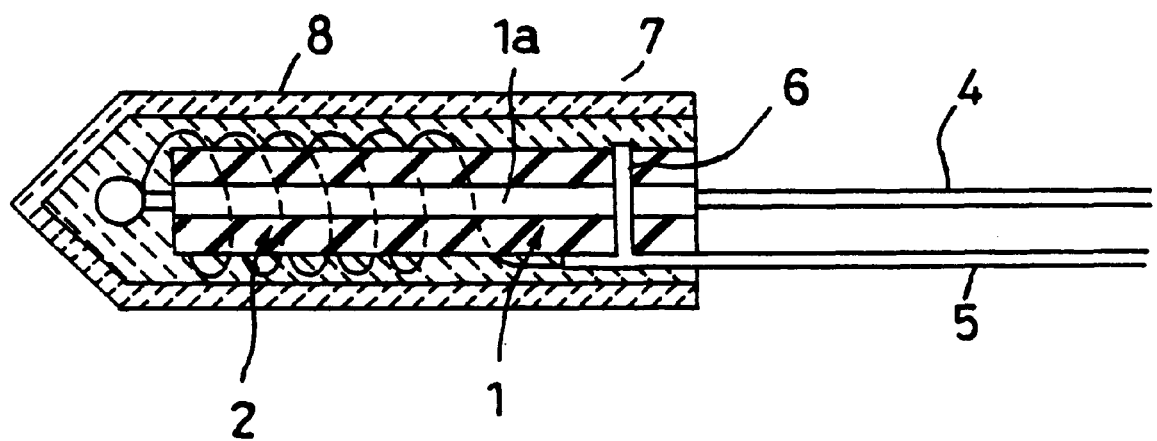
FIG. 2 is a view showing the heater-sensor complex illustrated in FIG. 1 as installed in an insulating pipe to form an insulation layer.

As illustrated in FIGS. 1 and 2, the principal part of the soldering iron heater used in the present invention comprises a cylindrical insulating pipe 1 having an axial bore 1a and a heater-sensor complex 2 mounted thereon. The insulating pipe 1 may for example be an alumina pipe.

Referring to FIG. 1 which illustrates the heater-sensor complex 2, a tip 3a of a coil-shaped heating wire 3 is welded to a tip 4a of a linear non-heating wire 4 by argon welding. The base end 3b of the heating wire 3 is welded to a linear non-heating wire 5. The heating wire 3 is made of iron-chrominum alloy. Typical examples of the alloy composition are shown in Table 1.

TABLE 1

|  | Cr | Al | Mn | C | Re |
|---|---|---|---|---|---|
| Class 1 | 23–27 | 3.5–5.5 | ≦1.0 | ≦0.15 | Balance |
| Class 2 | 17–21 | 2–4 | ≦1.0 | ≦0.15 | Balance |

Among such iron-chromium alloys, kanthal D (a kanthal wire manufactured by Kanthal Co.) is preferred. The proportions of its principal constituent elements are Cr=22.0 and Al=4.8. Such alternative compositions as Cr=22.0, Al=5.8, Cr=22.0, Al=5.3, and Cr=20.0, Al=4.0 can also be employed.

In this embodiment, the non-heating wire 4 is made of nickel but the non-heating wire 5 and the heating wire 3 are made of the same Kanthal D alloy. However, to prevent generation of heat in the non-heating wire 5, the diameter of the non-heating wire 5 is about 2.5 times as large as the diameter of the heating wire 3.

Figure 3:
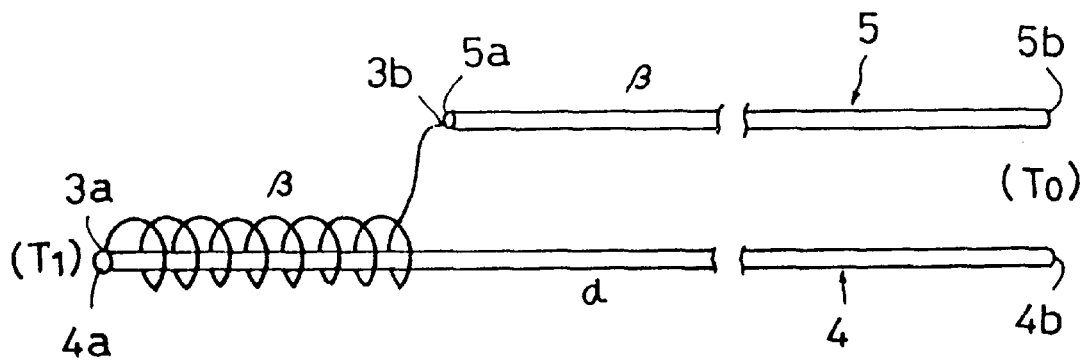
FIG. 3 is a diagram showing the temperature profile of the heater-sensor complex illustrated in FIG. 1.
Figure 3:
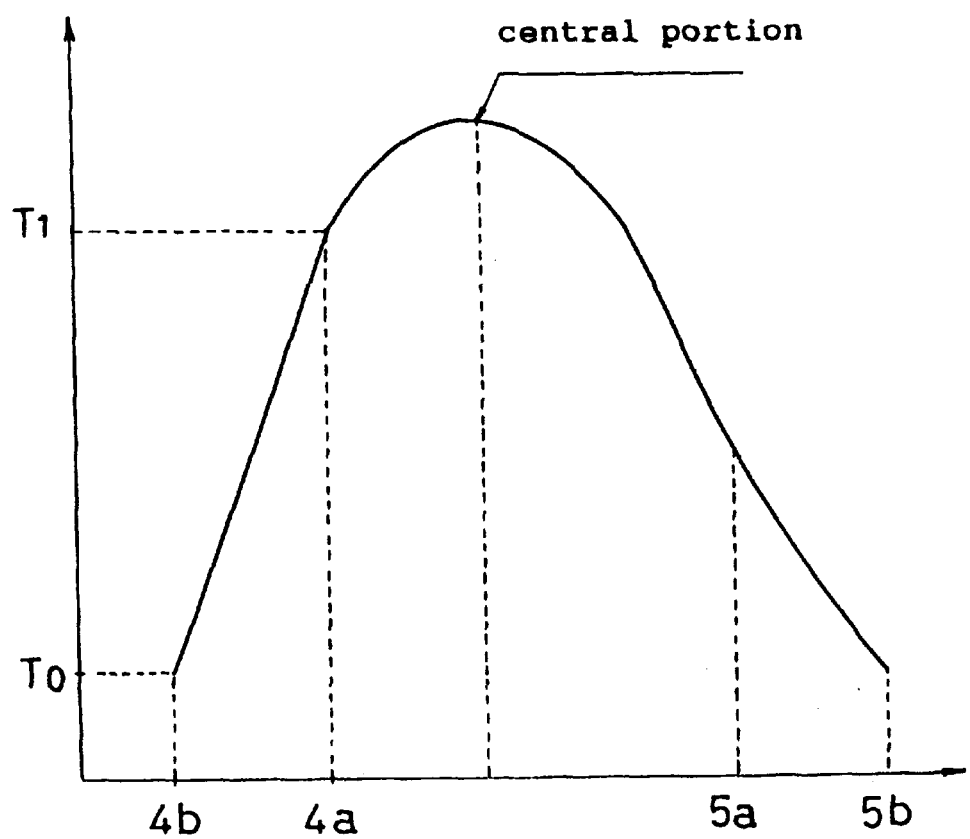

When a heater-sensor complex 2 of the above construction is supplied with an electric current, the heating wire 3 generates heat so that theoretically the temperature profile shown in FIG. 3(b) is obtained. Thus, whereas the temperatures of the base ends 4b, 5b of the non-heating wires 4, 5 are substantially identical and equal to T0, the argon-welded spots 4a, 3a assume a temperature of T1 and the heating wire 3 shows a high temperature in its central portion. The kanthal wires (3, 5) and the Ni wire (4) constitute a thermocouple, with the result that, assuming that the Seebeck coefficient of the Ni wire is $\alpha$ and the Seebeck coefficient of the Kanthal wires is $\beta$, an electromotive force of the order of $$\alpha(T1-T0)-\beta(T1-T0)$$

is generated between the base end 4b of the non-heating wire 4 and the base end 56 of the non-heating wire 5 (Kanthal wire).

Since $\alpha$ and $\beta$ are of different signs, the electromotive forces of the non-heating wires 4, 5 are added to each other. The temperature of the tip portion 5a of the non-heating wire 5 rises in accordance with the temperature gain of the heating wire 3 and, therefore, assuming that a Ni wire is chosen for the non-heating wire 5, the electromotive force between the base ends 4b, 5b of the non-heating wires 4, 5 is decreased.

TABLE 2

(Unit: mV)

| Temperature | 0 | 100 | 200 | 300 | 400 |
|---|---|---|---|---|---|
| 0 | 0 | 1.731 | 3.622 | 6.332 | 8.410 |
| 10 | 0.175 | 1.939 | 3.830 | 6.521 | 8.626 |
| 20 | 0.381 | 2.079 | 4.044 | 6.724 | 8.849 |
| 30 | 0.587 | 2.265 | 4.400 | 6.929 | 9.060 |
| 40 | 0.804 | 2.470 | 4.691 | 7.132 | 9.271 |
| 50 | 1.005 | 2.676 | 4.989 | 7.356 | 9.531 |
| 60 | 1.007 | 2.899 | 5.289 | 7.561 | 9.748 |
| 70 | 1.107 | 3.081 | 5.583 | 7.774 | 10.210 |
| 80 | 1.310 | 3.186 | 5.879 | 7.992 | 10.219 |
| 90 | 1.522 | 3.422 | 6.075 | 8.200 | 10.429 |
| 100 | 1.731 | 3.622 | 6.332 | 8.410 | 10.649 |

Figure 4:
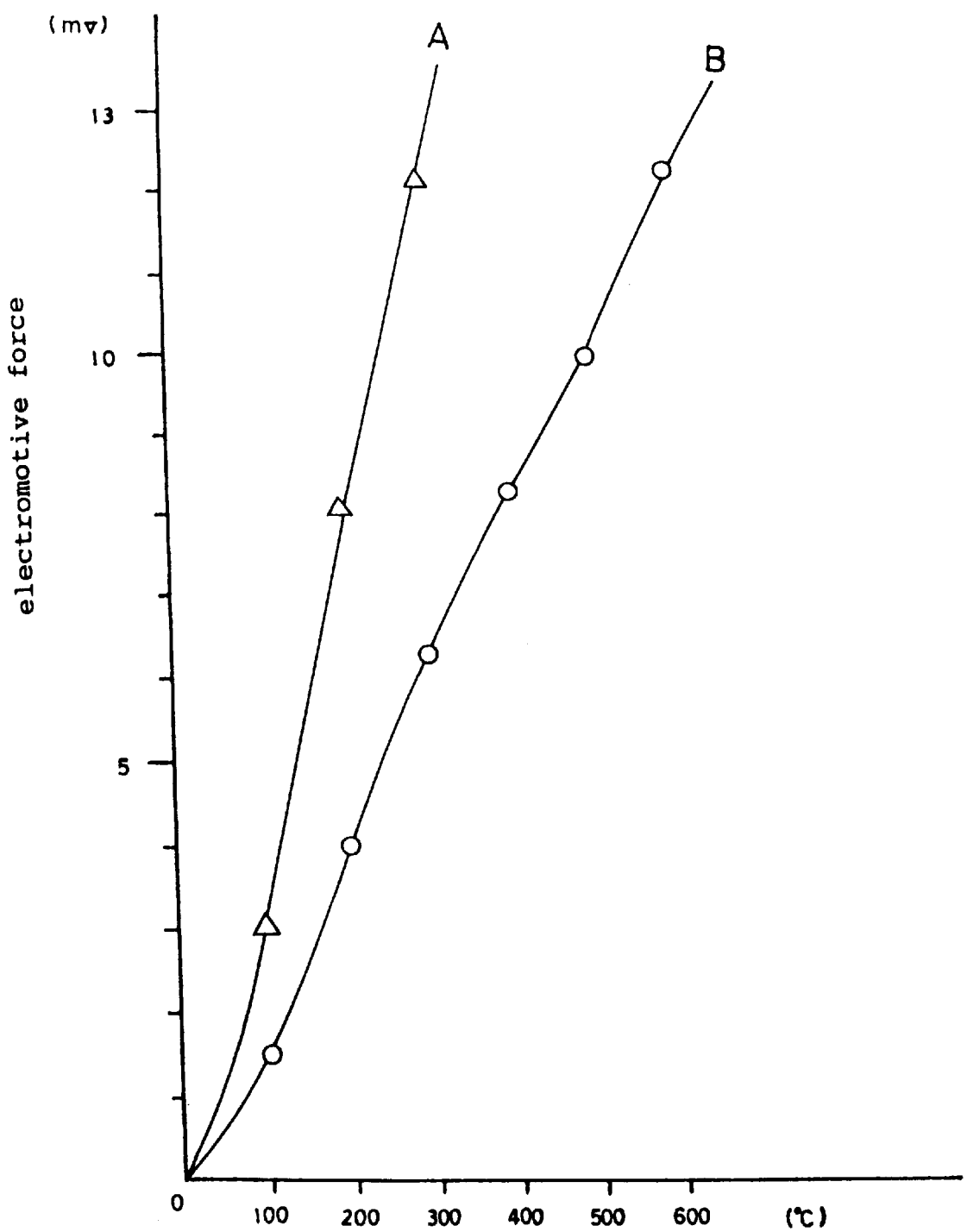
FIG. 4 is a diagram showing the thermo-electromotive force characteristic of the heater-sensor complex illustrated in FIG. 1.

Table 2 shows the measured characteristics of the heater-sensor complex 2. Thus, the temperature of the argon-welded spots 3a, 4a was increased from 0° C. to 500° C. and the voltage values at the ends of non-heating wires 4b, 5bwere measured. It will be seen from Table 2 that a good linearity can be obtained over the temperature range of 200° C.–450° C. which is generally used for soldering irons and that the sensor output is of the practically useful level. FIG. 4 is a diagram comparing the output characteristic of the heater-sensor complex 2 (B) with the characteristic of a thermocouple K (A), indicating that the electromotive force of the heater-sensor complex 2 is about one-half of the electromotive force of the thermocouple K. With this heater-sensor complex 2, a stable sensor output can be obtained up to 600° C. as can be seen from the diagram, indicating that this heater-sensor complex 2 can be used not only as a temperature sensor for soldering irons but also in other applications.

The method of manufacturing the soldering iron heater according to the present invention is now described. First, the non-heating wire 4 is passed into the bore 1a of the insulating pipe 1 and the heating wire 3 is wound round the periphery of the insulating pipe 1. Then, using a fixing wire 6 comprising a kanthal wire, the non-heating wire 5 is secured to the periphery of the insulating pipe 1 (FIG. 2).

Thereafter, a first ceramic coating 7 is applied by the dip coating technique over the argon-welded spots 3a, 4a, heating wire rod 3, and fixing wire 6 and the applied coating 7 is dried and fired. The first ceramic coating 7 mentioned above is an aqueous dispersion containing a binder and a coarse grade alumina powder and, when the applied coat is dried and fired, the argon-welded spots 3a, 4a and heating wire rod 3 are rigidly secured to the insulating pipe 1. Since this ceramic coating 7 is a dispersion of coarse particles, it effectively absorbs the difference in the coefficient of thermal expansion between the insulating pipe 1 and the heating wire 3 so that no cracking or cleavage occurs in use.

Figure 5:
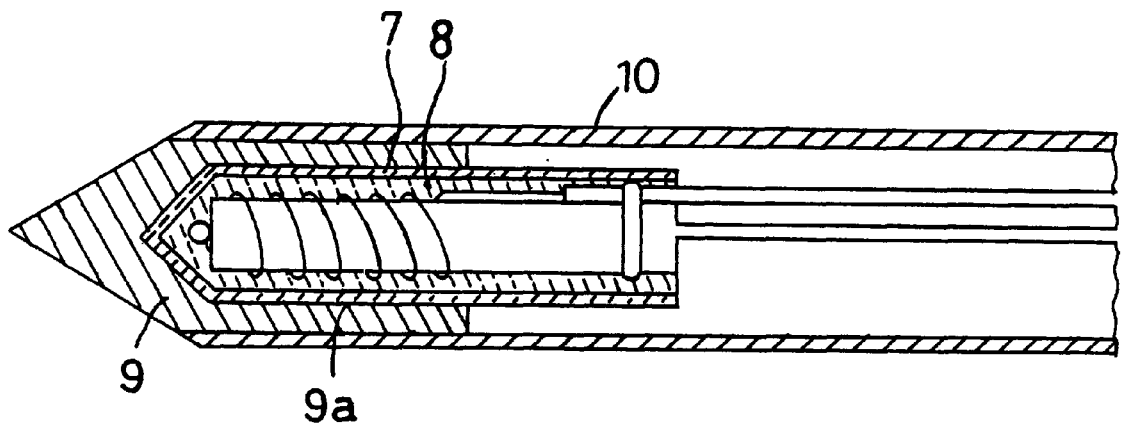
FIG. 5 is a view showing the geometric relationship of the heater-sensor complex illustrated in FIG. 2 to a protective pipe.

Then, a second ceramic coating 8 is applied by the dip coating technique, dried, and fired. At the same time, using this ceramic coating 8, the heater-sensor complex 2 is secured in the recess 9a formed in the tip portion 9 of the soldering iron (FIG. 5). Of course, the tip 9 of the soldering iron is made of a material having good thermal conductivity.

The second ceramic coating 8 is specifically an aqueous dispersion containing a binder and a fine alumina powder and when this coating is dried and fired, a positive insulation is obtained. Moreover, through this second ceramic coating 8, the heater-sensor complex 2 is rigidly secured to the tip portion 9 of the soldering iron.

Since, in the heater-sensor complex 2 of the present invention, the non-heating wire 4 is retained with a free air space around it in the bore 1a of the insulating pipe 1, the non-heating wire 4 is substantially not susceptible to the temperature of the heating wire 3. Moreover, as the non-heating wire 4 is a Ni wire resistant to oxidative corrosion, it can be disposed in contact with air.

Figure 6:
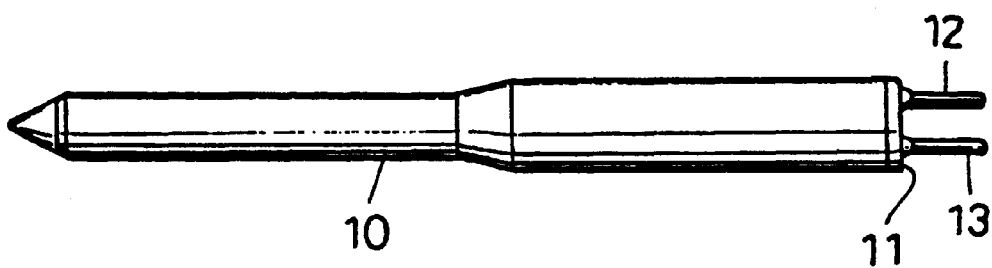
FIG. 6 is a view showing the overall shape of the soldering iron heater.
Figure 7:
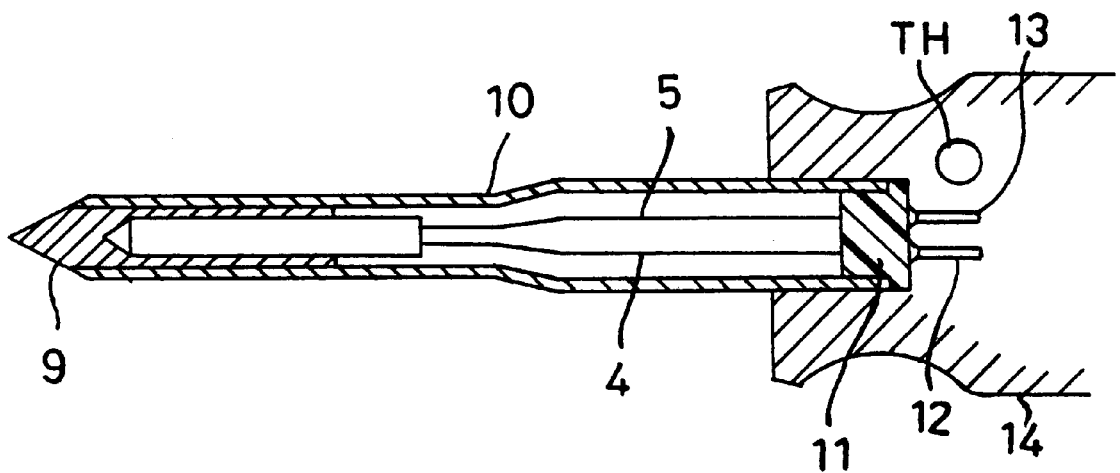
FIG. 7 is a sectional view showing the construction of the soldering iron.

After the heater-sensor complex 2 is securely installed in the recess 9a of the tip portion 9 of the soldering iron, the protective pipe 10 is secured to the periphery of the tip portion 9 at the base end side thereof (FIG. 5). Furthermore, a synthetic resin member (lead portion) 11 is fitted to the base of the protective pipe 10 with the connecting terminals 12, 13 extending out of the synthetic resin member, with the result that, as a whole, an integrated soldering iron heater is provided (FIG. 6). This soldering iron heater is mounted or dismounted by connecting or disconnecting said terminals 12, 13 with respect to the corresponding connectors. As illustrated in FIG. 7, the base side of the protective pipe 10 is firmly held by a grip member 14 and a thermister TH for temperature measurement is disposed in close proximity with the connecting terminals 12, 13.

Figure 8:
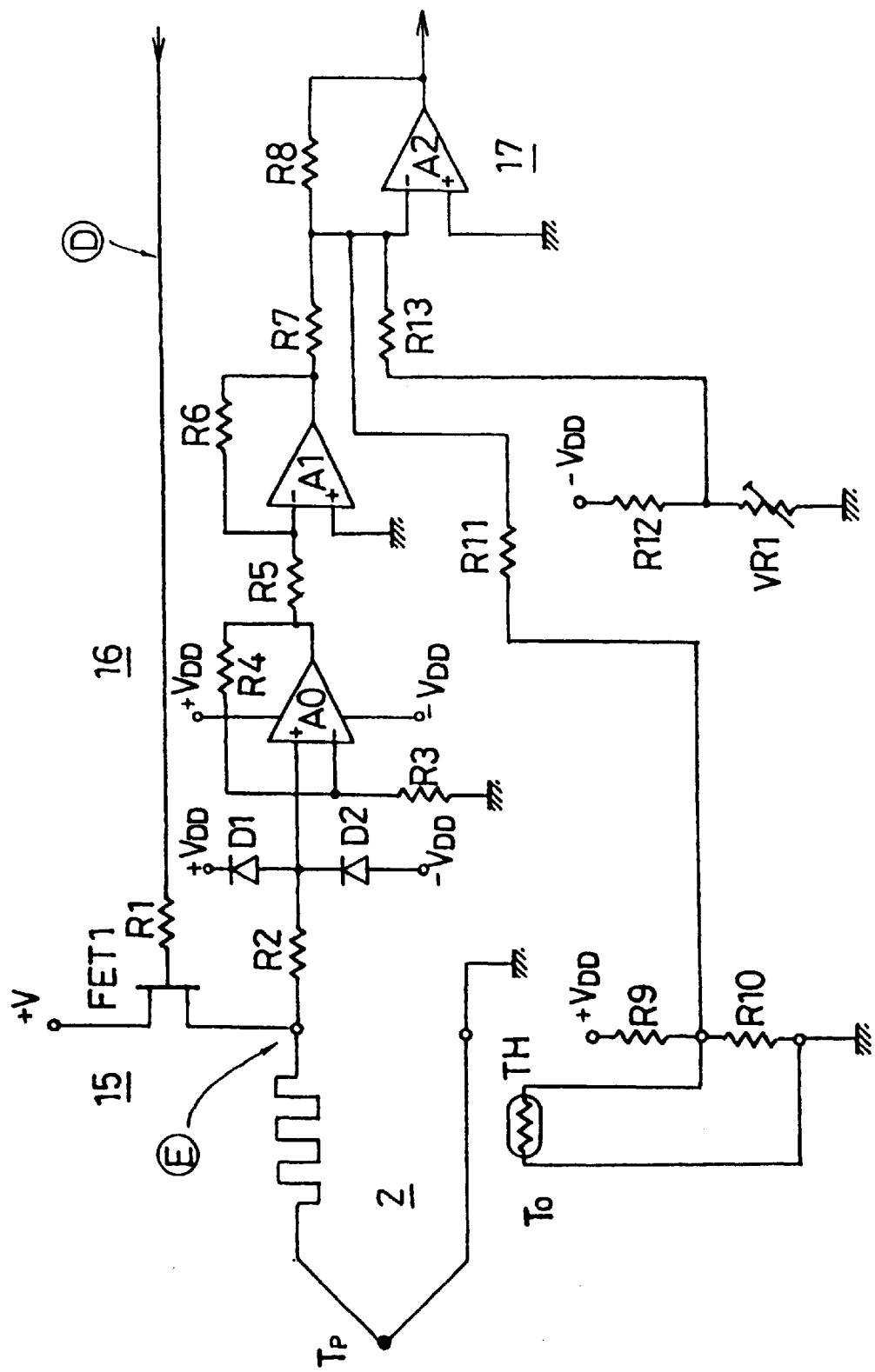
FIG. 8 is a diagram showing a part of the temperature control circuit of the soldering iron in Embodiment 1 of the present invention.
Figure 9:
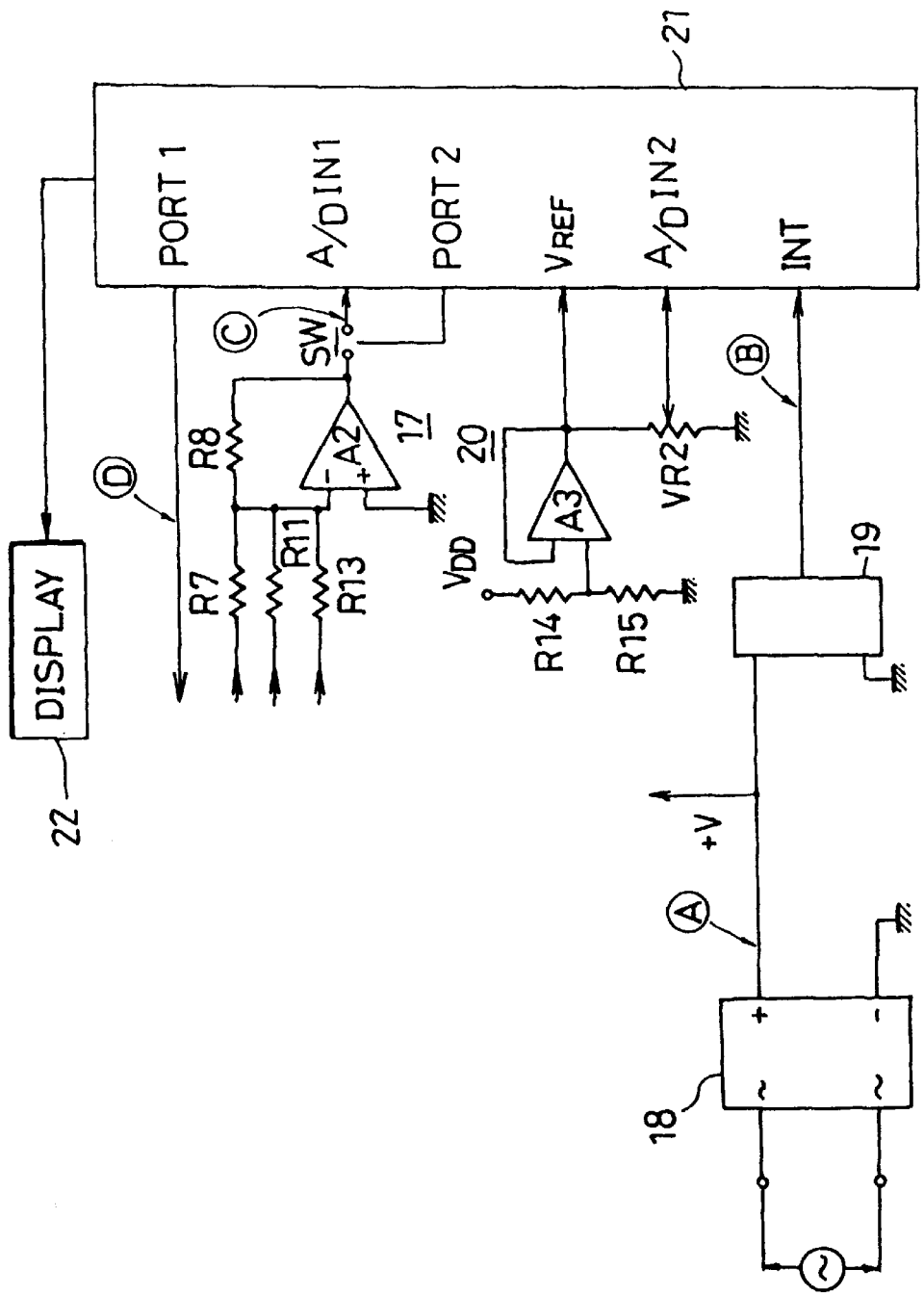
FIG. 9 is a diagram showing the remaining part of the same temperature control circuit.

FIGS. 8 and 9 show the temperature control circuit including the heater-sensor complex 2. The illustrated temperature circuit essentially comprises said heater-sensor complex 2 for heating the tip and detecting the tip temperature T1 of the soldering iron, said thermister TH for detecting the base end temperature T0 of the heater-sensor complex 2, a power supply block 15f or the heater-sensor complex 2, an amplifying block 16 for amplifying the thermocouple output from the heater-sensor complex 2, an adder block 17 for adding up the thermocouple output and thermister output, a full-wave rectifier 18 for rectifying an AC voltage (FIG. 9, the same applies to the following elements), a zero crossing pulse generator 19, a temperature setting block 20 for setting the tip temperature of the solider iron, and a microcomputer unit 21 for controlling the whole operation. The calculated tip temperature is indicated on a display 22 connected to the microcomputer unit 21.

In this embodiment, the microcomputer unit 21 is specifically a one-chip microcomputer M37470(Mitsubishi). This microcomputer unit 21 is provided with output ports, PORT1 and PORT2, and it is so arranged that the power supply block 15 is controlled ON/OFF according to the output data at PORT1 and the switch SW at the output of the adder 17 is controlled ON/OFF according to the output data at PORT2.

Furthermore, the microcomputer unit 21 is provided with analog input terminals ADIN1 and ADIN2, which are connected to an A/D converter. The output value from the adder block 17 is fed to the analog input terminal ADIN1 and the voltage value corresponding to the set temperature is fed to the analog input terminal ADIN2. The analog input terminal VREF of the microcomputer unit has been supplied with a reference voltage (e.g.2.55 V) for the A/D converter, whereby the resolution of the A/D converter is determined.

The microcomputer unit 21 is further provided with an interrupt terminal INT which is connected to the zero crossing pulse generator 19 so that when the full-wave-rectified pulse current value has reached 0 volt, an interrupt signal is applied to the microcomputer unit 21, whereupon the program of an interrupt routine is started.

As shown in FIG. 8, the power supply block 15 comprises a field-effect transistor FET1 and a resistor R1 connected to the gate terminal of the transistor FET1. The drain terminal of the transistor FET1 is connected to the output of the full-wave rectifier 18 +V (e.g. waveheight value=2.4 volts), while the source terminal is connected to the heat-sensor complex 2.

The amplifier 16 comprises a current limiting resistor R2, diodes D1, D2, a noninverting amplifier A0, resistors R3, R4, which implement an amplification factor of about 250, an inverting amplifier A1, and resistors R5, R6. According to this circuitry, the sensor voltage from the heater-sensor 2 is amplified about 250-fold and its phase inverted by said noninverting amplifier A0 and inverting amplifier A1. Resistance values may for example be R3=1KΩ, R4=250KΩ, and R5=R6=100 KΩ.

Since, in this circuit, the source voltages of the noninverting amplifier A0 are +VDD and −VDD (e.g. ±5volts), application of any voltage beyond the range of +VDD~−VDD to the noninverting amplifier A0 would cause deterioration of characteristics or even breakdown. Therefore, clamp diodes D1, D2 are provided so that only voltages within the range of +VDD+VF~−VDD−VF will be applied to the noninverting amplifier A1. It should be noted that VF is the forward voltage of the diodes D1, D2.

Now, when the transistor FET1 is ON, the voltage V−VDD−VF is applied to the resistor R2 but since the resistance value of resistor R2 is set to about 10 kΩ, only a current of about 2 mA at most flows. On the contrary, when the transistor FET1 is OFF, the thermocouple output from the heater-sensor complex 2 is applied to resistor R2 so that there may be cases in which a voltage drop in resistor R2 presents a problem. However, since the amplification is performed by the noninverting amplifier A0 in this invention, its input impedance Rin is sufficiently large to satisfy the condition of Rin>>R2, with the result that the exact thermocouple output can be detected. If an inverting amplifier be adopted for this amplification, the condition of Rin>>R2 might not be satisfied.

The adder block 17 essentially comprises an inverting amplifier A2 and resistors R7, R8, R11, and R13. To the thermister TH, a resistor R10 is connected in parallel, and the source voltage +VDD is fed through a resistor R9. Resistance values may for example be R7=R8=100 KΩ, R11=R13=47 KΩ, R9=220 KΩ, and R10=50 KΩ. Disposed between the adder block 17 and the microcomputer unit 21 is an open-close switch SW which is controlled from the output port PORT2 (FIG. 9).

In the adder block 17, the input from the inverting amplifier A1 is applied to the inverting amplifier A2 through resistor R7 and the input from thermister TH is fed to the amplifier A2 through resistor R11. Moreover, the voltage made available by dividing the source voltage −VDD by resistor R12 and variable resistor VR1 is fed to the inverting amplifier A2 through resistor R13.

Since the output of the inverting amplifier A2 is added to the A/D converter of the microcomputer unit 21, the output of the inverting amplifier A2 must be constantly maintained in the plus range regardless of the temperature-dependent change of the output voltages from the heat-sensor complex 2 and thermister TH. Therefore, in the present invention, the variable resistor VR1 is adjusted so that the output of the inverting amplifier A2 will always be within the range of 0 V–2.55 V.

As shown in FIG. 9, the temperature setting block 20 comprises resistors R14, R15, a buffer A3, and a variable resistor VR2. While a reference voltage VREF is applied to the variable resistor VR2, it is so arranged that by manipulating the variable resistor VR2 a voltage corresponding to the set temperature of 200° C.–450° C. can be applied to the analog input terminal AIN2 of the microcomputer unit.

Figure 10:
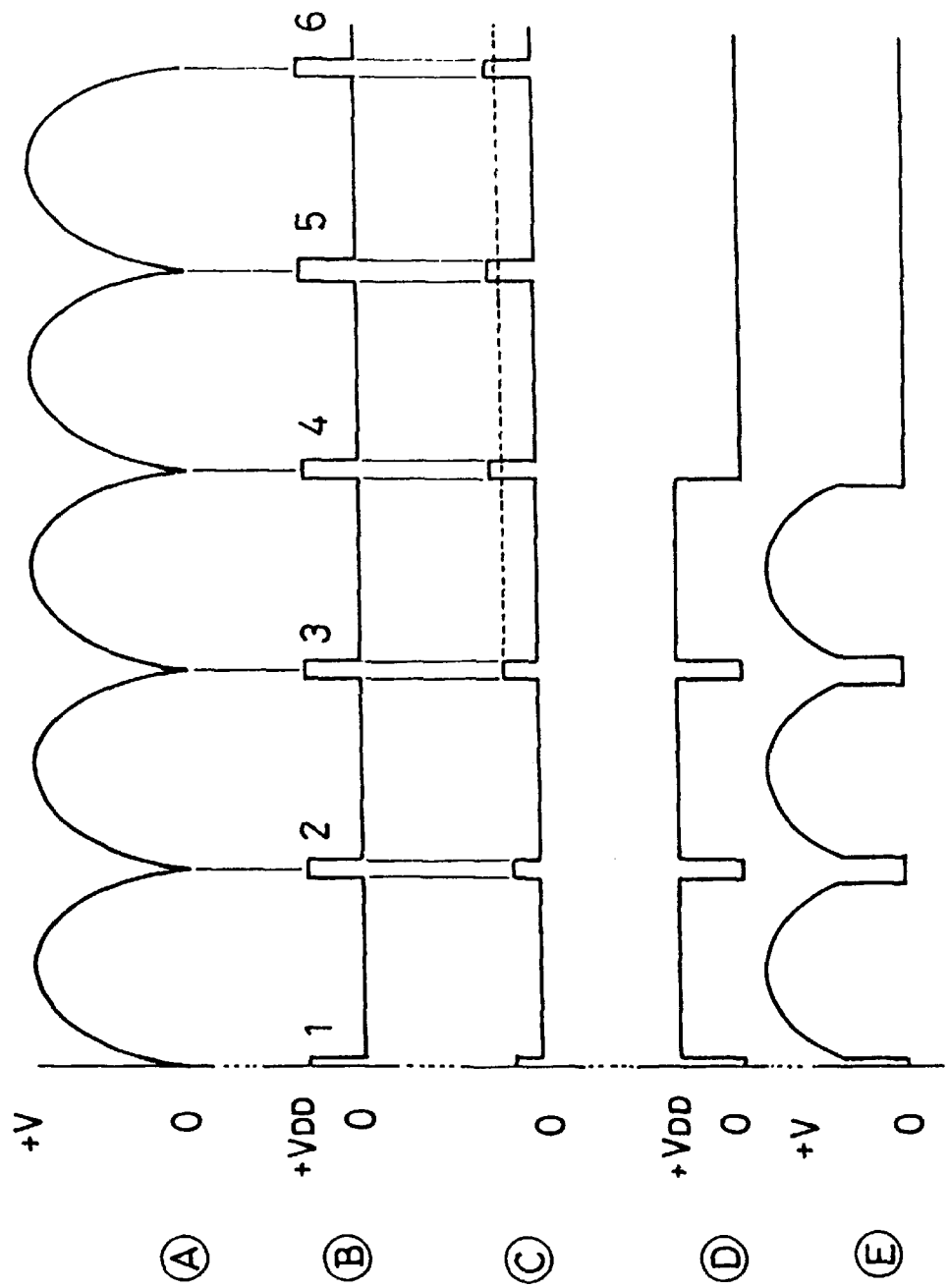
FIG. 10 is a timing chart showing the waveforms in the respective blocks of the control circuit illustrated in FIG. 8.
Figure 11:
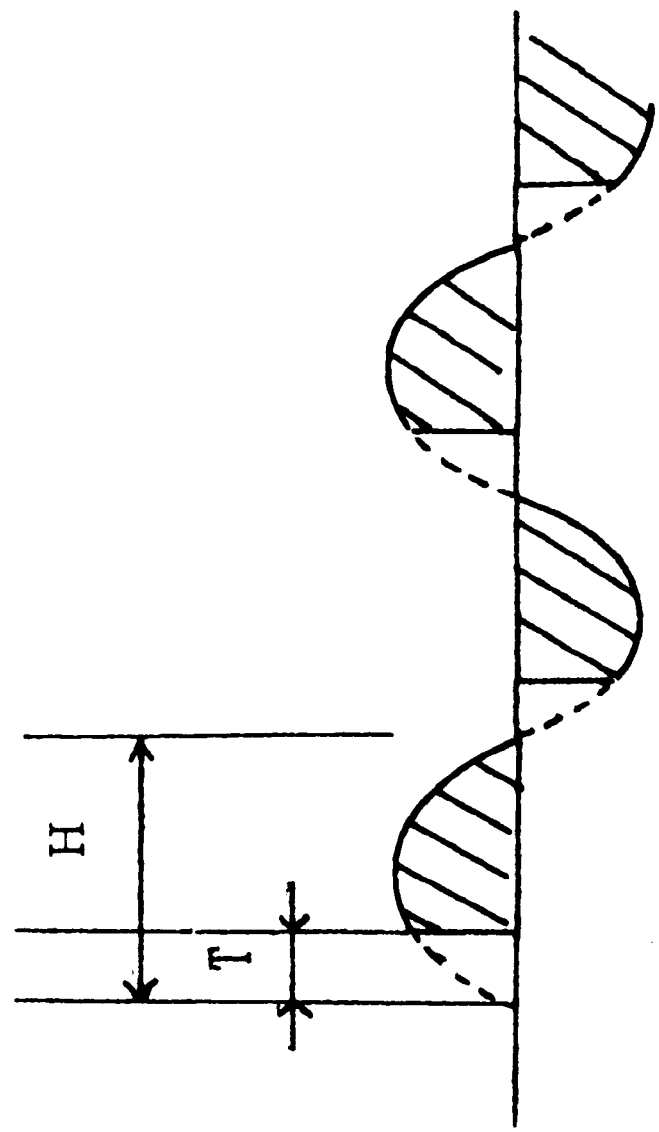
FIG. 11 is a timing chart describing the pulse width control method.

The operation of the control circuit shown in FIGS. 8 and 9 is now described with reference to the timing chart of FIG. 10. FIG. 10 shows the output of full-wave rectifying circuit (A), the output of Zero crossing pulse generator (B) the input to analog input terminal ADIN1 (C), output from output port PORT1 (D), and the terminal end voltages of heat-sensor complex 2(E).

When the output value of the full-wave rectifying circuit 18 becomes 0 volt and the output of the zero crossing pulse generator 19 is increased, the microcomputer 21 is interrupted by a pulse signal applied to the interrupt terminal INT. In the interrupt routine, the microcomputer unit 21 first outputs a control signal to the output ports PORT1, PORT2 to bring the transistor FET1 into OFF condition and set the open-close switch SW1 to ON position.

When the transistor FET1 is set in OFF condition, the current supply to the heater-sensor 2 is stopped so that only the thermocouple output appears at the two ends of the heater-sensor complex 2. This thermocouple output is a value corresponding to the temperature difference T1−T0 between the tip temperature T1 and the base (4b, 5b) temperature T0, and this thermocouple output is amplified about 250-fold in the amplifying block 16 and applied to the resistor R5 of the adder block 17. On the other hand, a voltage corresponding to the resistance value of thermister TH1 is applied to the resistor R7 in the adder block 17 and the resistance value of thermister TH1 changes in response to the temperature T0 of the base portions 4b, 5b of the sensor-heater complex 2. Therefore, the adder block 17 outputs a voltage corresponding to the soldering iron tip temperature T1. Since the open-close switch SW1 is in the ON state at this moment, this voltage corresponding to the tip temperature T1 is fed to the microcomputer unit 21 from said analog input terminal ADIN1.

Meanwhile, a voltage corresponding to the set temperature TS has been fed from the analog input terminal ADIN2. Therefore, the microcomputer unit 21 compares the voltage from the analog input terminal ADIN1 with that from the analog input terminal ADIN2 to figure out whether the current tip temperature Tp is higher than the set temperature value TS or not.

Now, when the interrupt pulse (FIG. 10(B)) is not later than the initial 3rd one, it means that the tip temperature TP is lower than the set temperature value TS. Under this condition TP<TS, the microcomputer unit 21 sets the open-close switch SW1 OFF through output port PORT2 and sets the transistor FET1 ON through output port PORT1 to end the interrupt routine. Then, because the transistor FET1 has been set ON, the output of the full-wave rectifying block 18 is fed as it is to the sensor-heater 2 so that the heater is energized to increase the soldering iron tip temperature.

Referring to the timing chart of FIG. 10, when the interrupt pulse is not later than the first 3rd one, the same operation as above is repeated so that the tip temperature TP rises. In response to this rise in tip temperature, the input to the analog input terminal ADIN1 is increased.

However, when the interrupt pulse is the 4th or subsequent one, it means that the soldiering iron tip temperature TP is higher than the set temperature TS(TP>TS) so that the microcomputer unit 21 brings the open-close switch SW1 and transistor FET1 into the OFF state through output ports PORT1, PORT2 to end the interrupt routine. As the transistor FET1 is thus set OFF, the power supply block 15 continues suspending the current supply to the sensor-heater complex 2 even after completion of the interrupt routine so that the soldering iron tip temperature drops continuously. Then, as the tip temperature TP falls below the set value TS (TP<TS), the power supply block 15 resumes the current supply to the heater-sensor 2.

As described above, the temperature control of a soldering iron tip in this apparatus depends on whether full-wave rectified voltage is ouputted. Because the heating voltage is not suddenly brought into "ON" state from "OFF" state, no high-frequency noise occurs unlike the pulse width control method.

Figure 12:
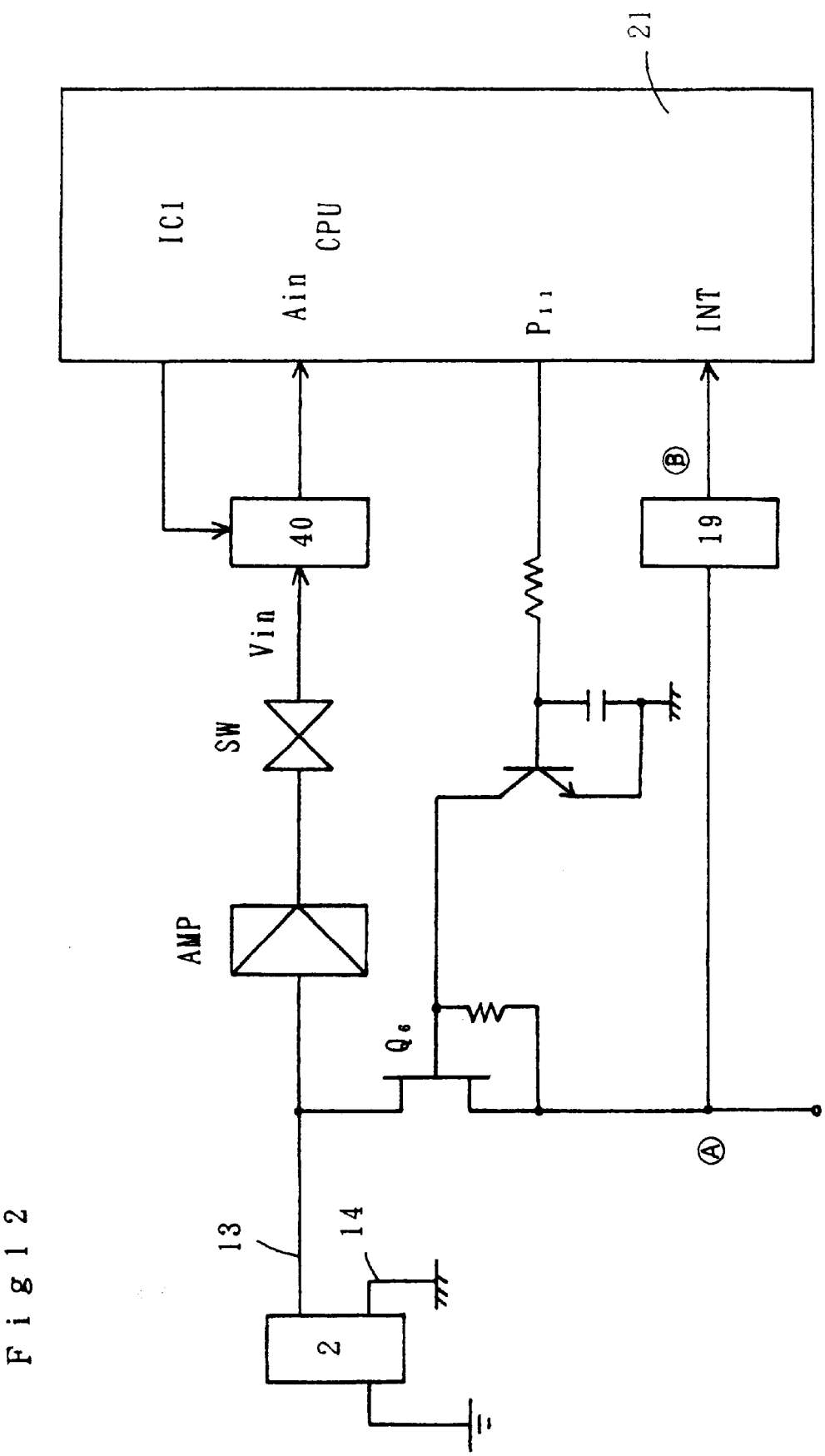
FIG. 12 is a diagram showing the principal parts of the circuit in Embodiment 2.

FIG. 12 shows the principal part of the circuit in Embodiment 2 of the present invention. While substantially the same as the circuit constructions of FIGS. 8 and 9, FIG. 12 has the voltage adjusting circuit 40 provided between the analog switch SW and the microcomputer unit 21.

Figure 13:
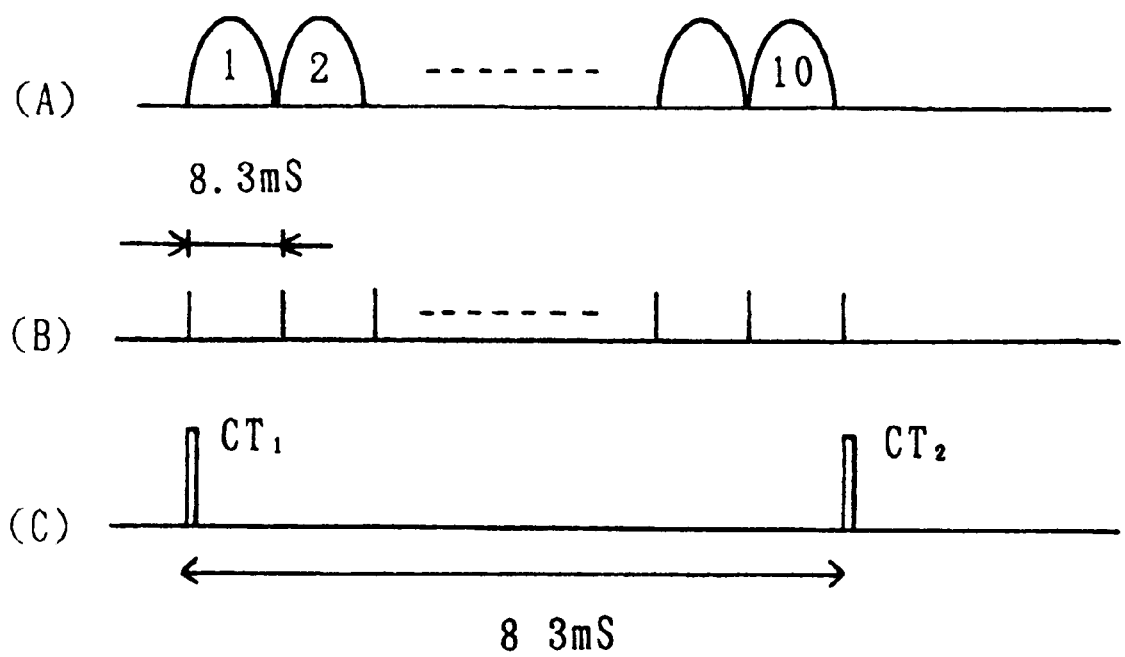
FIG. 13 is a timing chart showing the wave forms of the parts of the circuit in FIG. 12.

In the circuit of FIG. 12 as in Embodiment 1, the heating voltage A obtained through full-wave rectification is fed to the heater-sensor complex 2 through the field effect transistor Q6 switched on and off. When the field effect transistor Q6 is on, the heating wave 3 is heated and so is the tip portion 9. When the field effect transistor Q6 is off, the full-wave rectified voltage A is not supplied to the heater-sensor complex 2. At this time, the voltage between the terminals 13 and 14 of the heater-sensor complex 2 is amplified by the amplifier AMP and then fed to the analog input terminal Ain of the microcomputer unit 21 after passing through the analog switch SW and the voltage adjusting circuit 40. As in Embodiment 1, the zero crossing pulse generator 19 receives the full-wave rectified voltage A and generates the interrupt signal B. Unlike Embodiment 1, in this circuit the microcomputer unit 21 starts the temperature control CTi provided it receives the interrupt signal B 10 times(FIG. 13). That is, in Embodiment 2 differring from Embodiment 1, the temperature of the heater-sensor complex 2 is controlled at a time interval of 5/f. Since f represents the AC source frequency 50 Hz, the temperature control cycle 5/f is about 83.3 mS.

Figure 14:
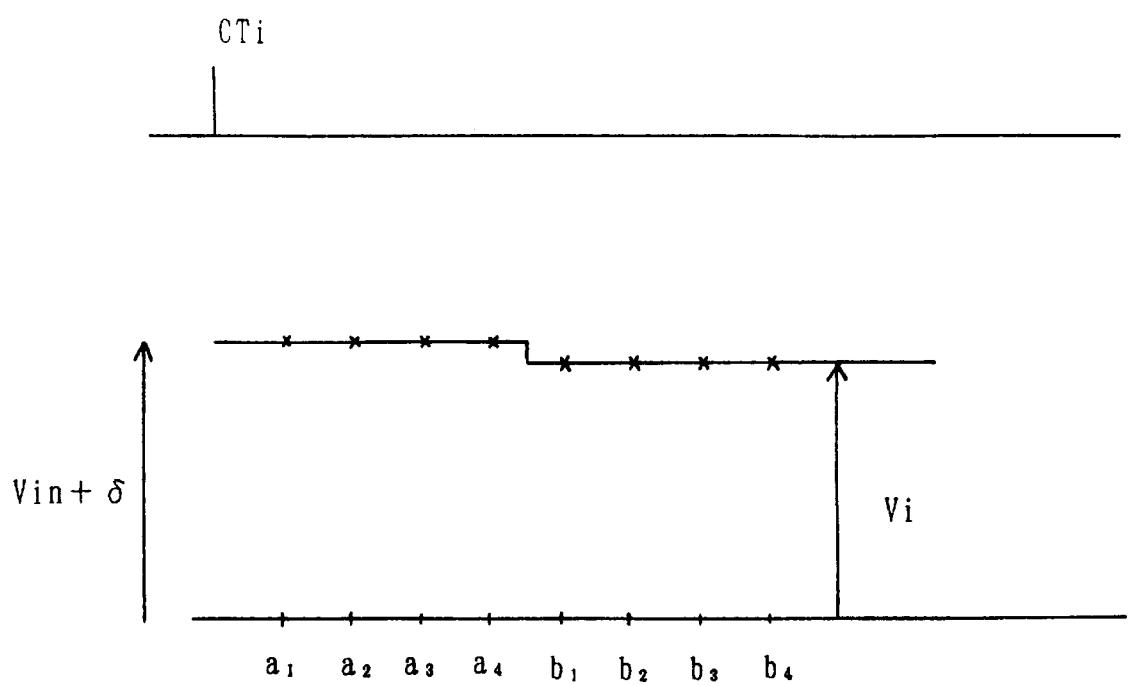
FIG. 14 is a timing chart describing the operations of the voltage adjusting circuit.

In Embodiment 2 unlike Embodiment 1, the voltage adjusting circuit 40 applies the voltage Vin or Vin+δ to the analog input interminal Ain of the microcomputer unit 21. In the temperature control CTi, the voltage Vin+δ is first applied to the mircocomputer unit 21. In this state, the microcomputer unit 21 reads four data(group a data: a1, a2, a3, a4). With the voltage Vin then applied, the mirocomputer unit 21 reads four data(group b data: b1, b2, b3, b4)(FIG. 14). After that, the microcomputer unit 21 calculates Σ(ai+bi)/4≈ OFFSET and averages the sums of the input voltages Vin and Vin+δ. This smoothing operation absorbs changes in input analog voltage and doubles the resolution of the A/D converter within the microcomputer unit 21. The above OFFSET value is predetermined based on the thermal capacity of the tip portion and meant to adjust temperature differences between the sensor portion and the work plane of the tip portion.

The resolution of the A/D conveter can be doubled as follows:

Suppose the A/D converter in Embodiment 2 is only capable of converting input analog voltage to the digital data 0~255. If so, the input analog voltages Vin of the 100.4 and 100.5 levels, for instance, are both recognized only as the digital data 100. So in the voltage adjusting circuit 40 the analog voltages of the 0.5 level is first added to the input analog voltage Vin.

Thus, the input analog voltage Vin of the 100.4 level is recognized as the digital data 100, and that of the 100.5 level as the digital data 101.

After the four data(group a) are thus read, the input analog voltages of the 100.4 and 100.5 levels are inputted as they are to the A/D converter. So the microcomputer unit 21 recognize both data as the digital data 100. The two kinds of data(groups a and b) thus obtained are then added up. So the input analog voltage of the 100.4 level is converted to the digital data 200(=100+100), and that of the 100.5 level to the digital data 201(=101+100). These operations convert the data 99.5≦D1<100.5 and 100.5≦D1<101.5 to 200 and 201 respectively. Hence, the resolution of the A/D conveter is doubled.

The digital data Temp thus obtained from the A/D conveter corresponds to the temperature of the tip portion 9, and so the microcomputer unit 21 compares the digital data Temp with the temperature Ref preset by the user. If this comparison shows Ref≦Temp, the microcomputer unit 21 outputs the L level signal to the digital output port P11 till the next temperature control Ti+1. So if the sensor temperature Temp calculated by the mirocomputer unit 21 is higher than the set temperature Ref, the field effect transistor field effect transistor Q6 remains off for about 83.3 mS till the next temperature control Ti+1.

Figure 15:
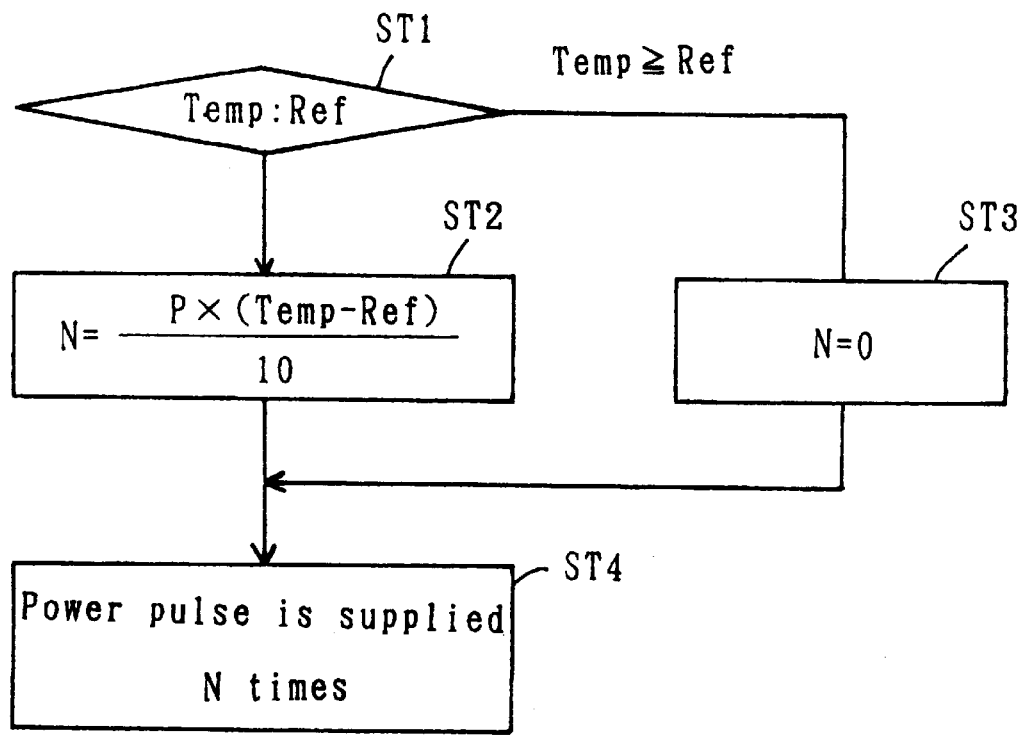
FIG. 15 is a flow chart describing the circuit operations in Embodiment 2.

On the other hand, if the above comparison shows Ref>Temp, the operation ST2 in FIG. 15 follows. In other words, in accordance with the value N calculated by P×(Temp−Ref)/10, the digital output P11 of the microcomputer unit 21 is raised to the H level during the N pulse.

Figure 16:
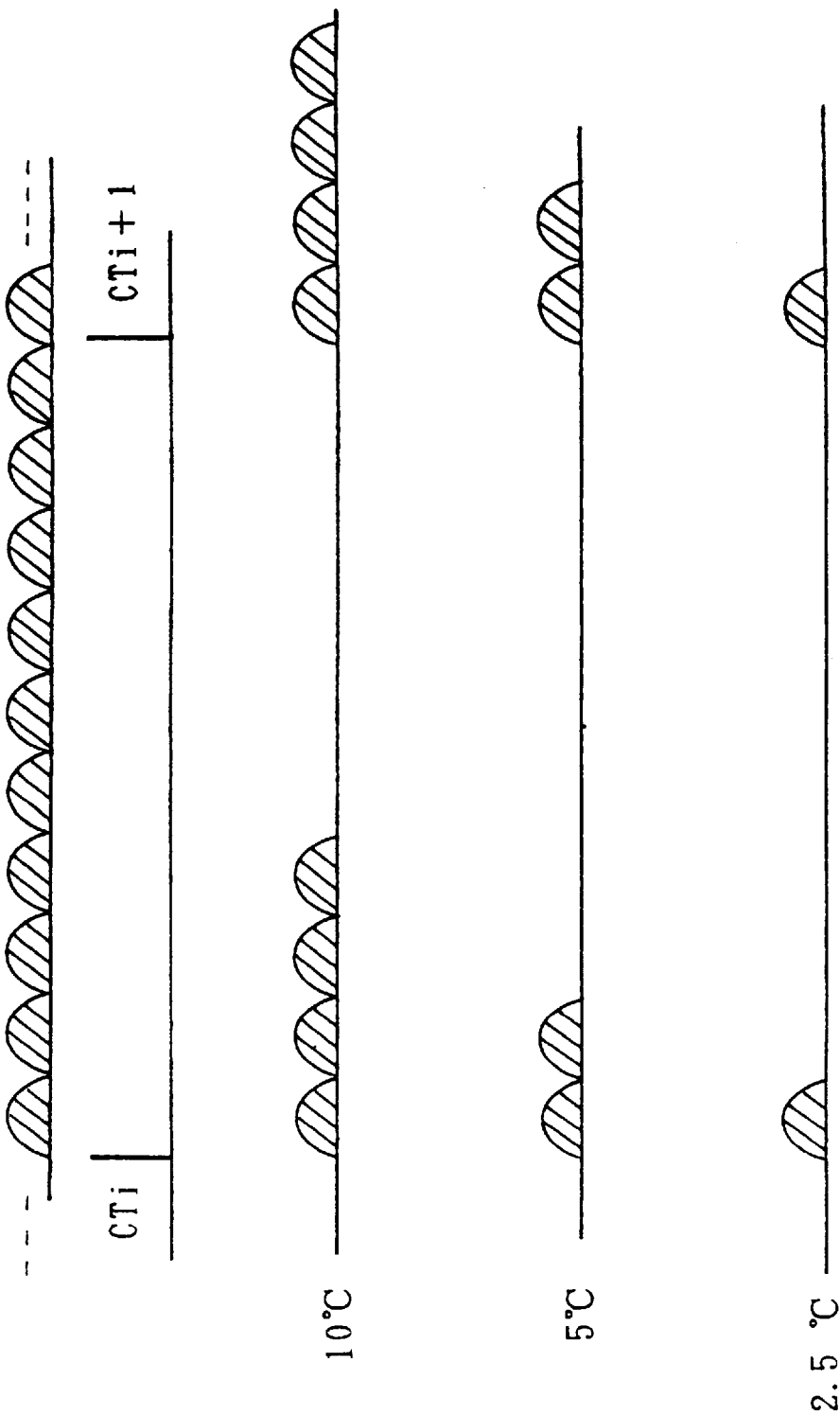
FIG. 16 is a timing chart describing the circuit operations in Embodiment 2.

Suppose the coefficient P, which is determined based on the thermal capacity of the tip portion 9, is set at 4. If, for example, the temperature difference(=Temp−Ref) is 10° C., four power pulses are supplied. Thus, if the differences are 5° C. and 2.5° C., one and two power pulses are supplied respectively(FIG. 16).

As mentioned above, the temperature control cycle in Embodiment 2 is 5/f. The number of power pulses whose cycle is 8.3 mS supplied to the heater-sensor complex 2 during this time determines the temperature of the tip portion 9. In such temperature control, the heating voltage is not suddenly brought into "ON" state from "OFF" state, and so no high-frequency noise occurs.

Figure 17:
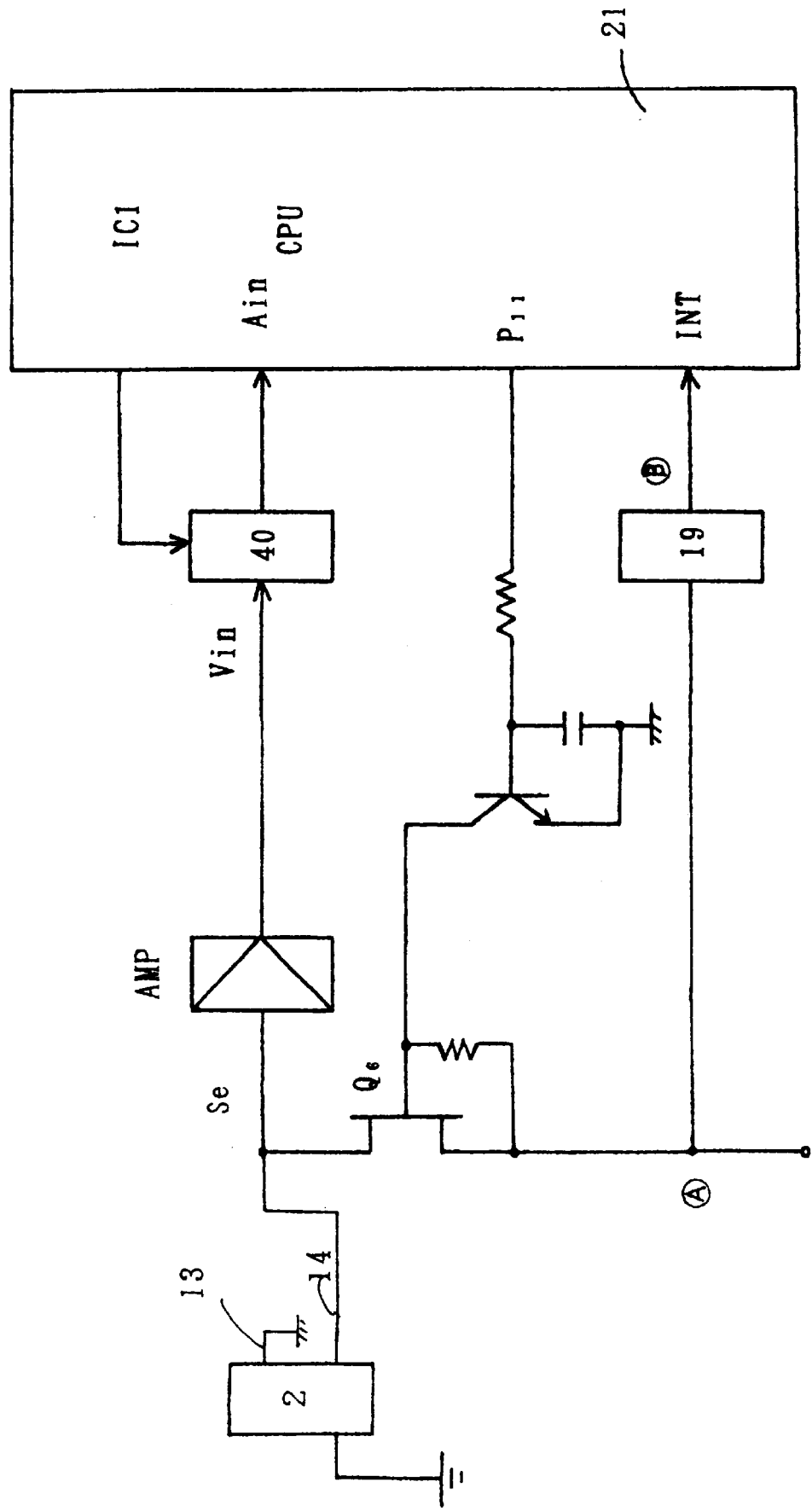
FIG. 17 is a diagram showing the principal part of the circuit in Embodiment 3.

FIG. 17 shows the principal construction of Embodiment 3 of the present invention. In this apparatus, the output terminals 13 and 14 of the heater-sensor complex 2 are connected in a manner converse to that of Embodiments 1 and 2 so that the heater-sensor complex 2 may generate minus level sensor voltage. Though smaller than the heating voltage A supplied by the power circuit, the sensor voltage Se obtained from the sensor-heater complex 2 can be detected at the zero crossing point Z as shown in FIG. 18. Thus, the microcomputer unit 21 reads the sensor voltage Se at the zero crossing point Z and detects the temperature of the heater tip through the same processing as above. In Embodiment 3, the analog switch SW can be eliminated, and so the fewer components make the apparatus more compact and its cost lower. In this embodiment, the field effect transistor field effect transistor Q6 is controlled in accordance with the flow chart shown in FIG. 15.

FIG. 19, which is a timing chart describing Embodiment 4, shows power voltage fed to the heater-sensor complex 2 through the field effect transistor Q6. In Embodiment 4, the field effect transistor Q6 is so controlled that it may be invariably brought into "OFF" state near the zero crossing point Z. So even if the analog switch SW is eliminated as in Embodiment 3, sensor voltage can be precisely detected at the zero crossing point Z. In FIG. 19, the "OFF" period of the power voltage is shown longer than it actually is for drawing purposes, but in practice the power voltage is turned off after it becomes sufficiently low. Thus, no high-frequency noise occurs.

Figure 20:
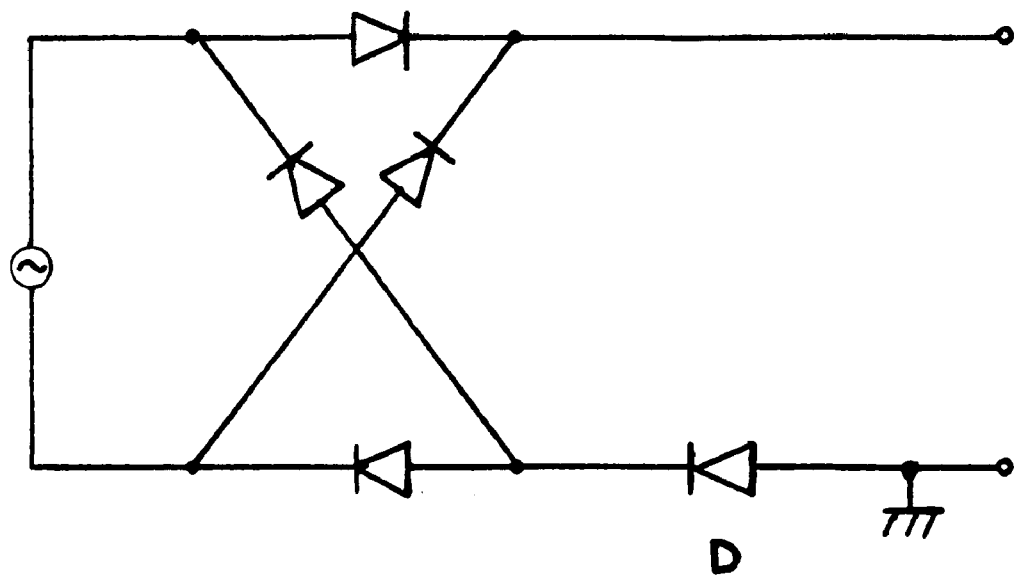
FIG. 20 is a diagram showing an improved power circuit.

To obtain the power voltage shown in FIG. 19, the field effect transistor Q6 is usually turned on and off, but this is not the only method. For example, as shown in FIG. 20, one or a few rectifying diodes D may be added to the full-wave rectifying circuit.

What is claimed is:

1. A method of controlling the tip temperature of a soldering iron of the kind receiving rectified AC power, in which a temperature control cycle is set at N times the cycle of AC power and the number of supply pulses of rectified voltage during each temperature control cycle is adjusted.

2. A soldering iron of the kind receiving rectified AC power, which is provided with tip temperature control means having a control cycle set at N times the cycle of the A/C power and adjusting the number of supply pulses of rectified voltage.

3. The soldering iron according to claim 2, which is provided with a heater-sensor complex comprising a heating member made of a first metallic material, a non-heating member made of the same first metallic material, and a non-heating member made of a second metallic material, said heating member made of said first metallic material, having one end of said heating member being connected to a forward end of said non-heating member made of said second metallic material, the opposite end of said heating member being connected to said non-heating member made of said first metallic material, said first metallic material being an electrothermic iron-chromium alloy and said second metallic material being a nickel or nickel-chromium alloy, thus forming a thermocouple therebetween.

4. The soldering iron according to claim 3, in which said heating member made of said first metallic material comprises a relative small gauge wire which is wound in the form of a coil around a cylindrical insulating pipe with a bore therein, said wire connected to said non-heating member made of the same first metallic material which is a linear relatively large gauge wire rigidly secured to the peripheral surface of said insulating pipe, and said non-heating member made of said second metallic material is a linear member passing into the bore of said insulating pipe.

* * * * *